(12) United States Patent
Palmers

(10) Patent No.: US 6,383,442 B1
(45) Date of Patent: May 7, 2002

(54) APPARATUS FOR INJECTION-MOLDING OR FORMATION OF WORK PIECES

(75) Inventor: Göran Palmers, Askim (SE)

(73) Assignee: Institutet För Verkstadsteknisk Forskning, Molndal (SE)

( * ) Notice: Subject to any disclaimer, the term of this patent is extended or adjusted under 35 U.S.C. 154(b) by 0 days.

(21) Appl. No.: 09/370,657

(22) Filed: Aug. 6, 1999

Related U.S. Application Data

(63) Continuation-in-part of application No. 08/737,567, filed as application No. PCT/SE95/00507 on May 9, 1995, now abandoned.

(30) Foreign Application Priority Data

May 11, 1994 (SE) .............................................. 9401659

(51) Int. Cl.7 .............................................. B29C 33/30
(52) U.S. Cl. ........................ 264/572; 72/61; 72/370.22; 264/573; 425/387.1; 425/451.9
(58) Field of Search .................................. 425/330, 356, 425/451.9, 541, 595, 387.1; 72/60, 61, 54, 370.22, 372, 379.2; 264/545, 572, 573, 334

(56) References Cited

U.S. PATENT DOCUMENTS

| 2,499,530 | A | | 3/1950 | Scott .......................... 425/356 |
| 3,278,993 | A | | 10/1966 | Brayman et al. ............. 425/77 |
| 3,545,241 | A | * | 12/1970 | Grankowski et al. .......... 72/60 |
| 4,348,165 | A | | 9/1982 | Vostrovsky .................. 425/185 |
| 4,422,995 | A | | 12/1983 | Schad ......................... 264/250 |
| 4,425,091 | A | | 1/1984 | Prince ......................... 425/595 |
| 4,500,274 | A | | 2/1985 | Cyriax et al. ................ 425/185 |
| 4,555,228 | A | | 11/1985 | Nishiike et al. ............. 425/185 |
| 4,658,618 | A | | 4/1987 | Hellgren .................. 425/405.1 |
| 4,676,086 | A | * | 6/1987 | Hellgren ........................ 72/60 |
| 4,810,181 | A | | 3/1989 | Ozawa ........................ 425/190 |
| 4,948,359 | A | | 8/1990 | Yasui .......................... 425/595 |
| 4,959,002 | A | | 9/1990 | Pleasant ................. 425/192 R |
| 5,387,094 | A | | 2/1995 | Ichikawa et al. ......... 425/451.9 |

FOREIGN PATENT DOCUMENTS

| DE | 3435805 | 6/1986 |
| DE | 3626019 | 11/1987 |
| JP | A 2-151414 | 6/1990 |

* cited by examiner

Primary Examiner—James P. Mackey
(74) Attorney, Agent, or Firm—Oppedahl & Larson LLP

(57) ABSTRACT

An apparatus for injection molding or forming of work pieces, including closed profile work pieces, is provided that is less expensive and requires less space than known press apparatus. The apparatus locks a molding tool assembled from two or more tool pieces to define the shape of a molded or formed product using a frame, and one or more presses. The frame defines an interior space extending from a first end of the frame to an opposed second end of the frame for receiving a molding tool. The presses are placed within the frame and act in concert with the frame to apply pressure to a molding tool. The interior space is large enough to receive an assembled molding tool into the interior space of the frame, while not permitting removal of the tool pieces from the product within the interior space.

17 Claims, 4 Drawing Sheets

APPARATUS FOR INJECTION-MOLDING OR FORMATION OF WORK PIECES

This application is a continuation-in-part of U.S. patent application Ser. No. 08/737,567, filed Nov. 12, 1996, now abandoned, which is the U.S. National Phase of PCT Application No. PCT/SE95/00507 filed May 9, 1995, both of which are incorporated herein by reference.

FIELD OF THE INVENTION

This application relates to an apparatus for formation of work pieces using a molding tool assembled from two or more tool pieces. The apparatus and method can be used for injection molding of plastics and some metals, and for hydrothermal forming.

BACKGROUND OF THE INVENTION

Injection molding and hydromechanical forming processes frequently employ large presses designed for press forces in the range of several tons for opening, closing, pressing together and locking the molding tool pieces. Presses of this type are expensive and require a lot of space. In addition, the large size requires distribution of forces over substantial distances, which can lead to distortions which must be compensated for at increased cost and complexity.

When forming closed profiles, e.g., pipes, the profile is put into a tool which is subsequently locked. A pressure medium is supplied internally to the profile, which expands until it conforms to the inner surface of the molding tool. It is advantageous to work several work pieces simultaneously in one molding tool, but this raises the demands upon the locking mechanisms.

SUMMARY OF THE INVENTION

The present invention provides an efficient apparatus and method for injection molding or forming of work pieces, including closed profile work pieces, that is less expensive and requires less space than known press apparatus. Thus, in accordance with an embodiment of the invention, an apparatus is provided for locking a molding tool assembled from two or more tool pieces to define the shape of a molded or formed product, comprising:

(a) a frame, said frame comprising a wall member that defines an interior space extending from a first end of the frame to an opposed second end of the frame, said interior space opening through the first and second ends of the frame and being large enough to receive an assembled molding tool into the interior space of the frame, while not permitting removal of the tool pieces from the product within the interior space; and (b) one or more hydraulic cylinders disposed within the frame and acting in concert with the frame for applying pressure on a molding tool received within the interior space in the frame.

DETAILED DESCRIPTION OF THE INVENTION

The apparatus according to the invention is adaptable to many different purposes and fields of use. Hereinafter, two specific embodiments are described, but the person skilled in the art will realize that different modifications and applications lie within the scope of the invention.

While the terms used in this application are generally used in a manner conventional in the art, certain terms will be first defined in the interest of clarity. As used in the specification and claims of this application:

"molding tool" refers to a structure which defines the shape of a product to be produced by a process such as injection molding or hydrothermal forming;

"tool piece" refers to a segment of a mold In general, two or more tool pieces are utilized to create the molding tool;

"work piece" refers to the product produced using the apparatus or method of the invention. References to "work piece" refer to single products, or to multiple products formed in a common forming step.

Figure 1:
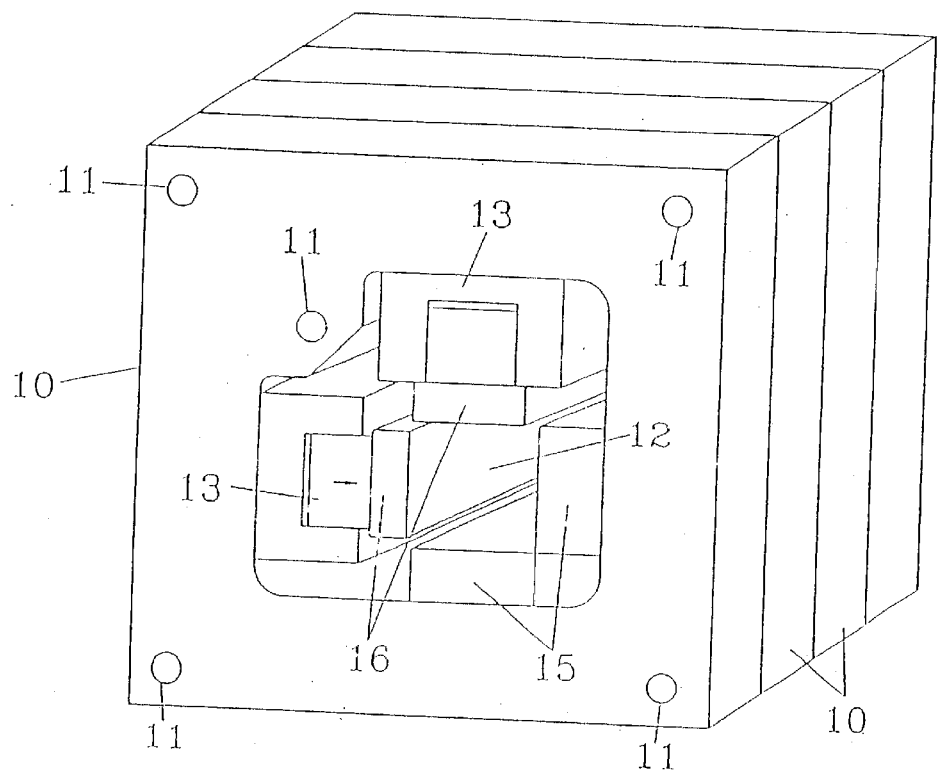
FIG. 1 in a perspective view shows an apparatus for locking molding tool halves in accordance with an embodiment of the invention.

FIG. 1 shows a first embodiment of the apparatus of the invention in which a number of quadratic (i.e. square) plates 10 are placed closely together in a stack. The plates 10 can have varying thicknesses. They are held together by means of five pull rods (not shown) which can be passed through five holes 11.

The plates 10 do not have to be quadratic, but they can have any other multi-sided, oblong or round form, and they can be held together by means of more or fewer than five pull rods. The pull rods are placed in such a way that the press force from the pull rods is distributed as evenly as possible through the frame.

An opening 12 is cut out in the central portion of each plate 10centrally in plate 10, such that the plates together cooperate to form a frame with an interior space extending from a first end of the frame to an opposed second end of the frame, said interior space opening through the first and second ends of the frame. In the embodiment shown in FIG. 1, the opening 12 is substantially quadratic with a rounded indentation at one corner.

Within the interior space formed by the openings 12, presses formed from hydraulic cylinders 13 and press plates 16 are positioned to apply pressure on an assembled molding tool placed within the interior space. In the embodiment of the invention shown in FIG. 1, there are two presses formed from hydraulic cylinders 13 and press plates 16, disposed at an angle of 90° with respect to each other. The presses work against anvil plates 15 to lock a molding tool placed within the interior space in the frame. The press plates 16 and anvil plates 15 may be exchangeable to allow adaption to the shape of a molding tool.

The size of the interior space remaining between the press plates 16 and the anvil plates 15 in the unlocked position is sufficient to allow the introduction of an assembled molding tool. The interior space is not, however, sufficient to permit the insertion of the tool pieces without prior assembly, or the stripping of the tool pieces from a completed work piece without first removing the molding tool and work piece from the interior of the frame.

Figure 2:
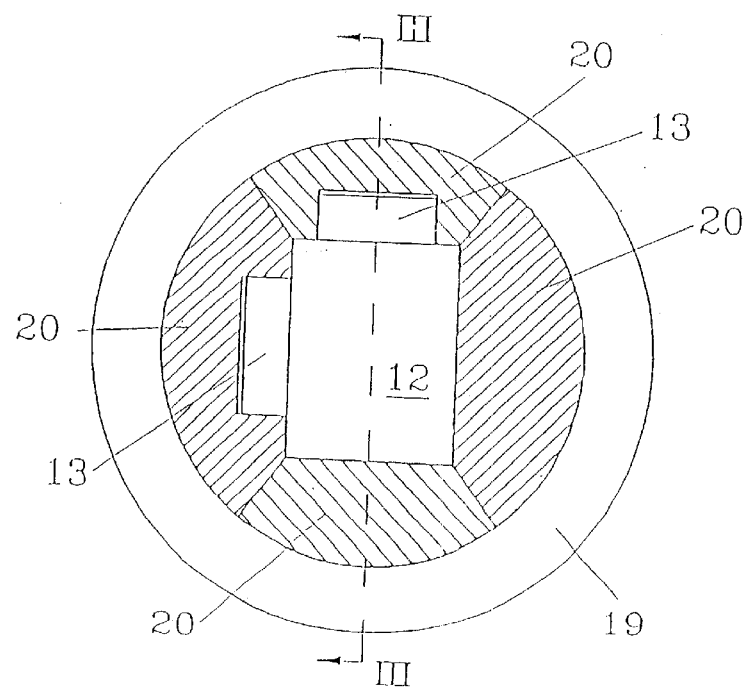
FIG. 2 is an end view of an alternative design of an apparatus for locking molding tool halves in accordance with a first embodiment of the invention.
Figure 3:
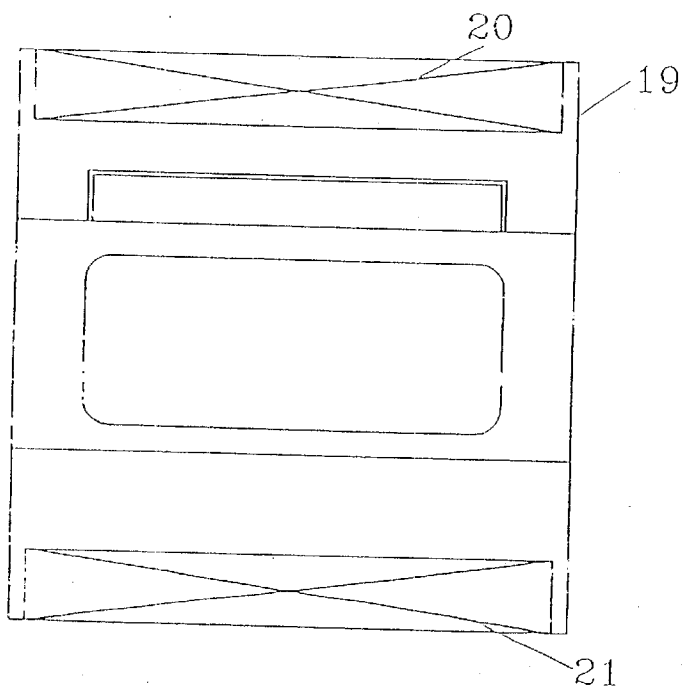
FIG. 3 is a section along line III—III in FIG. 2.

FIGS. 2 and 3 show a second embodiment of the apparatus of the invention in which a cylindrical pipe 19 is used as the frame. Filling inserts 20 are inserted into the pipe to act as anvils for the presses 13. The pipe 19 can be wound with a high tensile wire 21 which creates an inner pretensioning of the frame. As in the case of the embodiment of FIG. 1, the interior space 12 defined by the filling inserts 20 and the presses 13 is sufficient to allow the introduction of an assembled molding tool, but not sufficient to permit the insertion of the tool pieces without prior assembly, or the stripping of the tool pieces from a completed work piece without first removing the molding tool and work piece from the interior of the frame.

The apparatus of the invention is utilized by first assembling two or more tool pieces to form a molding tool of the desired conformation in a space exterior to the apparatus. The assembled molding tool in then inserted into the interior space within the frame, and the presses are activated to lock the molding tool. A work piece is then formed within the molding tool, for example by injection molding or hydromechanical forming. The molding tool and work piece are then removed from the interior space within the frame prior to the removal of the tool pieces from the work pieces.

Because the molding tool is assembled and opened outside the apparatus of the invention, the presses used can have a very short stroke, for example a stroke of about 30 mm. With such a short stroke, the apparatus can be very compact and cost efficient, in spite of the high pressure forces which are applied. Indeed, the construction cost of an apparatus in accordance with the invention can be as much as 70 to 90% less than the cost of a long stroke press with comparable productivity. Furthermore, the use of short stroke presses results in more even force distributions and reduced deformation of the frame.

In the apparatus of the invention, as exemplified in FIGS. 1–3, the molding tool can be pushed into or be withdrawn from the interior space through either end. This reduces set up time considerably, and allows emptying of fluid to be effectuated outside the press apparatus. In some cases, however, it is desirable to have closures at the ends of the frame during the actual molding process. Such closures cooperate with the frame elements 10, 19 to lock the molding tool in a third dimension. One or both of the closures can be provided with an additional press, so that press forces can be applied from at least three different and substantially orthogonal directions.

Figure 4:
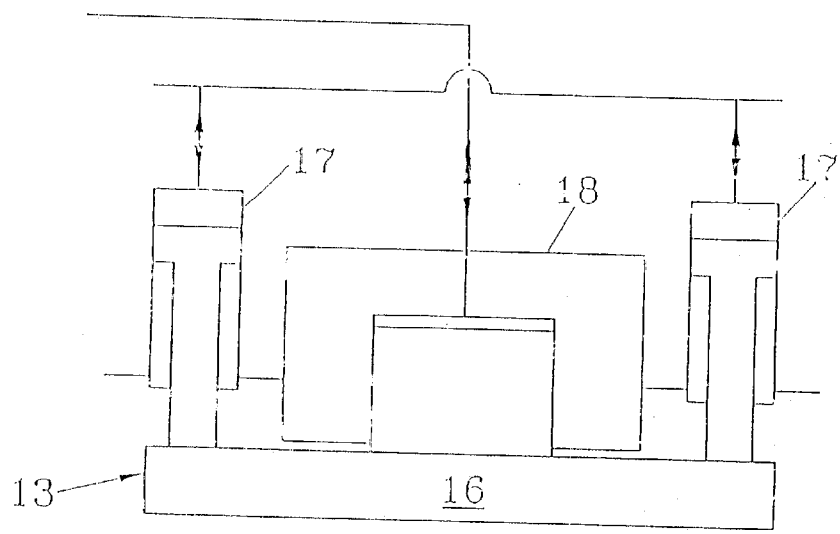
FIG. 4 schematically in a side view shows hydraulic pistons for controlling locking of the took halves.
Figure 5:
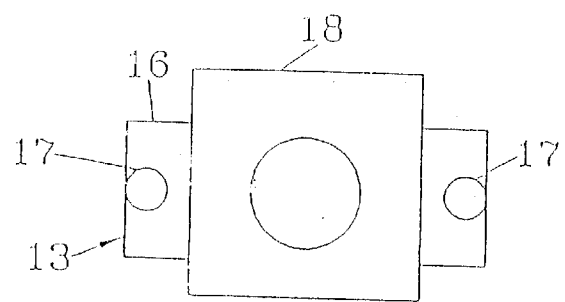
FIG. 5 schematically in a plane view shows the hydraulic pistons of FIG. 4.

FIGS. 4 and 5 show a type of press which can be used in the apparatus of the invention in greater detail. As shown, press plate 16 is maneuverable in response to three hydraulic pistons, two pistons 17 disposed on either side of the press plate, and a centrally disposed piston 18. Piston 18 may be considerably more powerful than pistons 17. In a preferred embodiment, pistons 18 is used for pressing and locking the molding tool, and pistons 17 are used for pulling the press plate back from the molding tool at the end of the process. Alternatively, all three pistons can be used for generating press force.

As a specific example, piston 18 of one press can be dimensioned for a press force of 300 tons, while the other press has a piston with a press force of 500 tons. These presses can be disposed around an interior space for receiving a molding tool having the following approximate dimensions: 300×400×1000 mm.

Figure 6A:
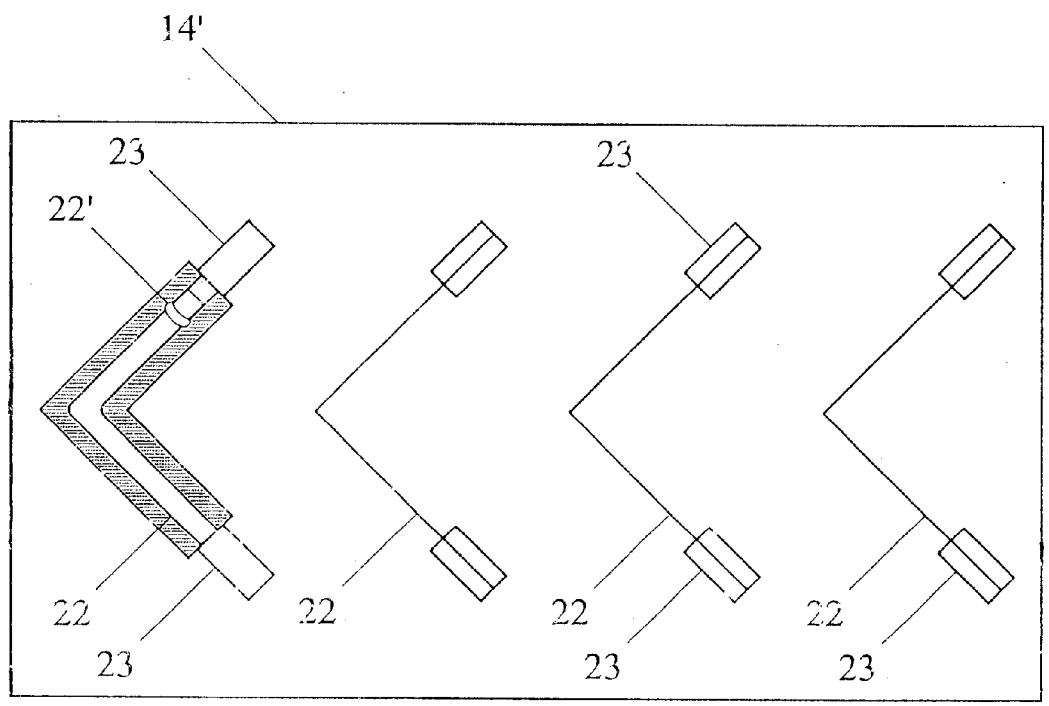
FIGS. 6A and 6B show an example of a molding tool half in plane and cross-sectional views.

FIGS. 6A and B show one of two tool pieces 14' which can be assembled into a molding tool for insertion into the interior space of an apparatus in the accordance with the invention. This tool piece is designed for the simultaneous molding of four work pieces 22 in one work cycle. The work pieces each have an enlarged part 22'. The energy for forming the work pieces is supplied hydromechanically by means of water pressure which is supplied to each work piece 22 via connection 23 which is attached to the molding tool. These are in turn connected to pumps (not shown) which generate pressure impulses. As shown in FIGS. 6A and B, the pressure surfaces are integrated close to the work piece in order to improve tightening and form stability. The area closest to the mold at the interface between two tool pieces is somewhat higher (less than 1 mm, and probably less than 0.1 mm, depending on the size of the tool) than the surrounding surface of the tool piece. This means that the force applied to keep the tool parts together will be concentrated in this area, forming a stronger closing bond between the two tool pieces and allowing for a better molding operation.

Figure 7:
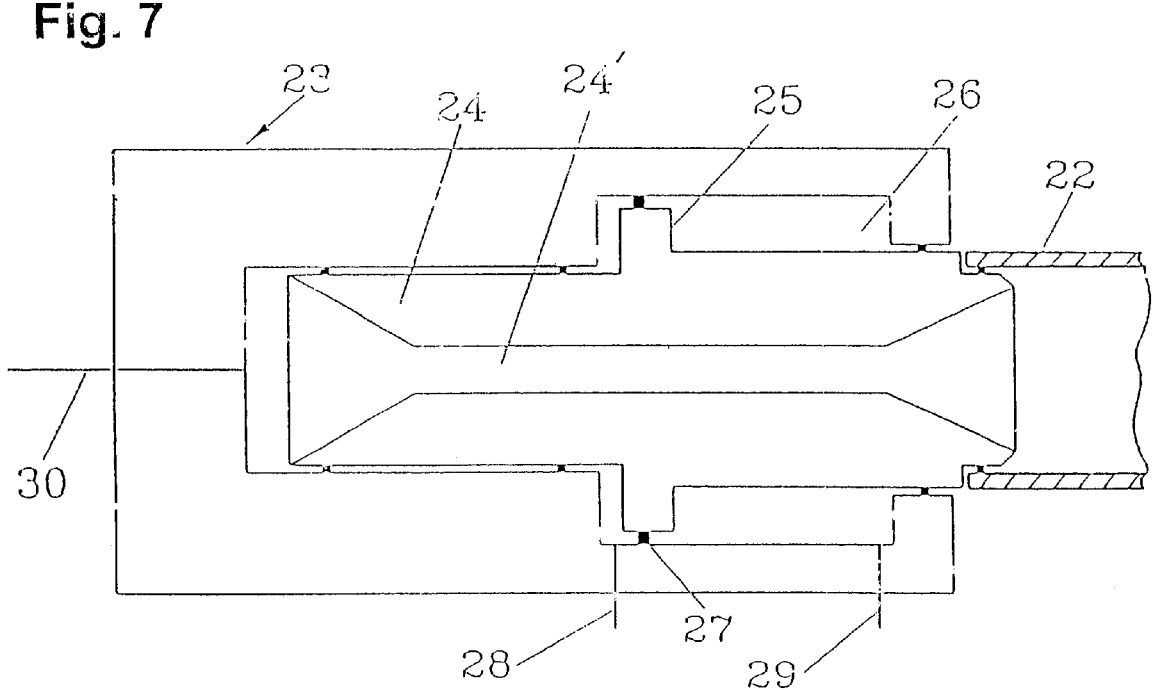
FIG. 7 in a larger scale shows a connection which is used in the molding tool half of FIGS. 6A and B.

FIG. 7 shows a connection 23 in greater detail. The connection has an inner displaceable part 24 which protrudes for some distance into the work piece 22, and is sealed to the work piece 22 with a sealing ring 70. The displaceable part 24 is traversed by a conduit 24' for the hydromechanical medium. Piston flange 25 is displaceable within a cylindrical space 26 in the connection 23. The piston flange 25 is provided with a sealing ring 27 which abut the cylinder wall. Pressure medium is provided to the work piece via conduit 24' via pressure medium connection 30.

The displaceable part 24 can be maneuvered in one direction or the other within the connector 23 because each side of the piston flange 25 is in communication with a controllable pressure medium via conduits 28 and 29. In this way, the distance that the displaceable part 24 protrudes can be adjusted in response to changes in the work pieces (such as the inclusion of enlarged part 22') to maintain the sealing engagement of the connector with the work piece. This compensation is made with balanced pressure since both small ends of the displaceable part 24 are of equal size, and are subjected to equal pressure from the pressure medium introduced through connector 30.

Alternatively, the pressure medium connection 30 can be directly connected to the displaceable part 24 via a piston rod which protrudes through the end wall of the connection means.

The apparatus of the invention is preferably used in combination with a surveillance system for monitoring the progress of the injection molding or forming process. In this cases, sensors adapted for sensing different parameters of relevance to safety and to production quality can be included in the apparatus, or in the tool pieces used in the apparatus. These parameters include dimensional changes in the work piece with reference to the applied force, nosie, vibrations and temperature. All measurements can be data processed in real time, so that the work cycle can be interrupted or altered when a fault is registered. In particular, it may be desirable to allow for the separate control of the hydraulic cylinders to permit for alteration and balancing of the locking pressure on the tool during formation of the work piece.

Figure 6B:
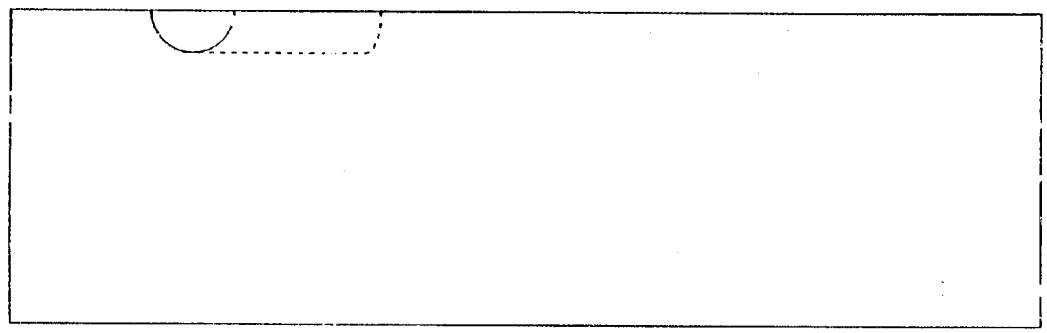

The invention is not limited to the above-described embodiments, but may be varied in various ways. For example, the molding tool can be made up of more than two part. Similarly, the connection means for pressure medium or for supply of injection molding material can be located on the molding tool, as shown in FIG. 6, or they can be arranged separately as a dockable unit.

What is claimed is:

1. An apparatus for locking a forming tool for hydromechanical forming of sheet and tubular materials using a press force of at least some hundreds of tons, which forming tool is assembled from two or more tool pieces defining the shape of a formed product, comprising:

(a) a frame, said frame comprising a wall member that defines an interior space extending from a first end of the frame to an opposed second end of the frame, said interior space opening through the first and second ends of the frame and being large enough to receive an assembled forming tool into the interior space of the frame, while not permitting removal of the tool pieces from the product within the interior space;

(b) one or more presses disposed within the frame and acting in concert with the frame for applying pressure on a forming tool received within the interior space in the frame, said one or more presses delivering a press force of at least some hundreds of tons; and (c) a connection for supplying a pressure medium to the interior of one or more work pieces, wherein the connections comprise a displaceable part which enables the length of the connection to be altered to compensate for variations in length of the one or more work pieces.

2. The apparatus of claim 1, further comprising a forming tool disposed in the interior space.

3. The apparatus of claim 2, wherein the connection is disposed for supplying a pressure medium to the interior of one or more tubular work pieces.

4. The apparatus according to claim 1, wherein the connections comprise a pressure medium connection mounted directly on the displaceable part.

5. The apparatus according to claim 1, wherein the connections comprise a pressure medium connection mounted upon a piston rod which is connected to the displaceable part, which piston rod protrudes out through an end piece on the pressure medium connection.

6. The apparatus of claim 2, wherein the shape of the forming tool is such that the work piece defined by the forming tool is tubular.

7. The apparatus of claim 2, wherein the shape of the forming tool is such that the work piece defined by the forming tool is formed in a sheet of material.

8. The apparatus of claim 1, wherein two presses are disposed within the frame and are oriented to apply pressure in two perpendicular directions.

9. The apparatus according to claim 8, wherein a third press is disposed within the frame and oriented to apply pressure in a third direction perpendicular to the directions of both first two presses.

10. The apparatus of claim 1, wherein the frame is formed from a plurality of elements.

11. The apparatus of claim 10, wherein the elements are each a planar plate, and wherein each planar plate is provided with aligned through-holes for receiving pull rods which hold the plates together to form the frame.

12. The apparatus according to claim 10, wherein the frame is formed from a cylindrical pipe and a plurality of filling inserts disposed within the pipe.

13. The apparatus of claim 1, further comprising one or more sensors for sensing parameters of relevance to safety and product quality during a work cycle.

14. The apparatus of claim 1, further comprising one or more press anvils disposed in the interior space opposite the one or more presses.

15. The apparatus of claim 14, wherein the press anvils are exchangeable to permit adaption to forming tools of different conformations.

16. A method for forming a formed work piece, comprising the steps of (a) assembling two or more tool pieces to form a forming tool of the desired conformation;

(b) inserting the assembled forming tool into an apparatus for locking the forming tool comprising a frame, said frame comprising a wall member that defines an interior space extending from a first end of the frame to an opposed second end of the frame, said interior space opening through the first and second ends of the frame and being large enough to receive an assembled forming tool into the interior space of the frame, while not permitting removal of the tool pieces from the product within the interior space; one or more presses disposed within the frame and acting in concert with the frame for applying pressure on a forming tool received within the interior space in the frame, and a connection for supplying a pressure medium to the interior of one or more work pieces, wherein the connections comprise a displaceable part which enables the length of the connection to be altered to compensate for variations in length of the one or more work pieces;

(c) activating the presses using a press force of at least some hundreds of tons to lock the forming tool;

(d) forming a work piece within the forming tool by hydromechanical forming of sheet and tubular materials; and (e) removing the forming tool and work piece from the apparatus and then separating the forming tool from the work piece.

17. A method for locking a forming tool formed from a plurality of tool pieces into position for forming of a work piece, comprising, (a) assembling two or more tool pieces to form a forming tool of the desired conformation;

(b) inserting the assembled forming tool into an apparatus for locking the forming tool comprising a frame, said frame comprising a wall member that defines an interior space extending from a first end of the frame to an opposed second end of the frame, said interior space opening through the first and second ends of the frame and being large enough to receive an assembled forming tool into the interior space of the frame, while not permitting removal of the tool pieces from the product within the interior space; one or more presses disposed within the frame and acting in concert with the frame for applying pressure of at least some hundreds of tons on a forming tool received within the interior space in the frame, and a connection for supplying a pressure medium to the interior of one or more work pieces, wherein the connections comprise a displaceable part which enables the length of the connection to be altered to compensate for variations in length of the one or more work pieces; and (c) activating the presses to apply a pressure of at least some hundreds of tons to lock the forming tool.

* * * * *